US011467664B2

(12) United States Patent
Zhang et al.

(10) Patent No.: US 11,467,664 B2
(45) Date of Patent: Oct. 11, 2022

(54) SYSTEM AND METHOD FOR ROBUST TOUCH DETECTION FOR ON-SKIN AUGMENTED REALITY/VIRTUAL REALITY INTERFACES

(71) Applicant: CARNEGIE MELLON UNIVERSITY, Pittsburgh, PA (US)

(72) Inventors: Yang Zhang, Pittsburgh, PA (US); Christopher Harrison, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/069,782

(22) Filed: Oct. 13, 2020

(65) Prior Publication Data

US 2021/0109593 A1 Apr. 15, 2021

Related U.S. Application Data

(60) Provisional application No. 62/973,569, filed on Oct. 11, 2019.

(51) Int. Cl.
*G06F 3/01* (2006.01)

(52) U.S. Cl.
CPC .................................... *G06F 3/015* (2013.01)

(58) Field of Classification Search
CPC ............................................... G06F 3/011–015
See application file for complete search history.

(56) References Cited

U.S. PATENT DOCUMENTS

2010/0295809 A1* 11/2010 Kim ...................... G06F 3/0442 345/173
2019/0212823 A1* 7/2019 Keller ..................... G06F 3/015

OTHER PUBLICATIONS

Harrison C., et al. "Skinput: appropriating the body as an input surface." In Proceedings of the SIGCHI conference on human factors in computing systems, pp. 453-462. 2010.
Harrison, C. et al. "OmniTouch: wearable multitouch interaction everywhere." In Proceedings of the 24th annual ACM symposium on User interface software and technology, pp. 441-450. 2011.
Holz, C. et al. "Implanted user interfaces." In Proceedings of the SIGCHI conference on human factors in computing systems, pp. 503-512. 2012.
Cohn, G. et al. "Humantenna: using the body as an antenna for real-time whole-body interaction." In Proceedings of the SIGCHI Conference on Human Factors in Computing Systems, pp. 1901-1910. 2012.
Hachisuka, K. et al. "Intra-body data transmission for the personal area network." Microsystem Technologies 11, No. 8-10 (2005): 1020-1027.

(Continued)

*Primary Examiner* — Hang Lin
(74) *Attorney, Agent, or Firm* — Michael G. Monyok

(57) ABSTRACT

A system and method for detecting when a user contacts one arm to an opposing arm. The system comprises an emitter worn by the user on one arm and a receiver located on an opposing arm, on the user's head, or on a different part of the user's body. Contact, or touch, is indicated by comparing the value of an electrical signal flowing along a path establish, in part, through the user's skin to a threshold. When touch is initiated, multiple electrical paths are created, including one that generates airborne signal emanating from the user's body.

20 Claims, 8 Drawing Sheets

(56) References Cited

OTHER PUBLICATIONS

Karitsuka, T. et al. "A wearable mixed reality with an on-board projector." In The Second IEEE and ACM International Symposium on Mixed and Augmented Reality, 2003 Proceedings , pp. 321-322. IEEE, 2003.
Laput, G. et al.. "Skin buttons: cheap, small, low-powered and clickable fixed-icon laser projectors." In Proceedings of the 27th annual ACM symposium on User interface software and technology, pp. 389-394. 2014.
Liang, RH et al. "SonarWatch: appropriating the forearm as a slider bar." In SIGGRAPH Asia 2011 Emerging Technologies, pp. 1-1. 2011.
Matthies DJC et al. "Botential: Localizing on-body gestures by measuring electrical signatures on the human skin." In Proceedings of the 17th International Conference on Human-Computer Interaction with Mobile Devices and Services, pp. 207-216. 2015.
Mistry, P. et al. "WUW-wear Ur world: a wearable gestural interface." In CHI'09 extended abstracts on Human factors in computing systems, pp. 4111-4116. 2009.
Mujibiya, A. et al. "The sound of touch: on-body touch and gesture sensing based on transdermal ultrasound propagation." In Proceedings of the 2013 ACM international conference on Interactive tabletops and surfaces, pp. 189-198. 2013.
Dezfuli, N. et al. "PalmRC: imaginary palm-based remote control for eyes-free television interaction." In Proceedings of the 10th European conference on Interactive tv and video, pp. 27-34. 2012.
Pratorius, M. et al. "SkInteract: An on-body interaction system based on skin-texture recognition." In IFIP Conference on Human-Computer Interaction, pp. 425-432. Springer, Cham, 2015.
Gustafson, S. et al. "Imaginary phone: learning imaginary interfaces by transferring spatial memory from a familiar device." In Proceedings of the 24th annual ACM symposium on User interface software and technology, pp. 283-292. 2011.
Hachisu, T. et al. "Enhancedtouchx: Smart bracelets for augmenting interpersonal touch interactions." In Proceedings of the 2019 CHI Conference on Human Factors in Computing Systems, pp. 1-12. 2019.
Varga, V. et al. "Designing groundless body channel communication systems: Performance and implications." In Proceedings of the 31st Annual ACM Symposium on User Interface Software and Technology, pp. 683-695. 2018.
Weigel, M. et al. "Iskin: flexible, stretchable and visually customizable on-body touch sensors for mobile computing." In Proceedings of the 33rd Annual ACM Conference on Human Factors in Computing Systems, pp. 2991-3000. 2015.
Xiao, R. et al. "Direct: Making touch tracking on ordinary surfaces practical with hybrid depth-infrared sensing." In Proceedings of the 2016 ACM International Conference on Interactive Surfaces and Spaces, pp. 85-94. 2016.
Xiao, R. et al. "LumiWatch: On-arm projected graphics and touch input." In Proceedings of the 2018 CHI Conference an Human Factors on Computing Systems, pp. 1-11. 2018.
Xiao, R. et al. "MRTouch: Adding touch input to head-mounted mixed reality." IEEE transactions on visualization and computergraphics 24, No. 4 (2018): 1653-1660.
Yamamoto, G. et al. "PALMbit: a body interface utilizing light projection onto palms." 映像情報メディア 学会誌 61, No. 6 (2007): 797-804.
Zhang, Y. et al. "Skintrack: Using the body as an electrical waveguide for continuous finger tracking on the skin." In Proceedings of the 2016 CHI Conference on Human Factors in Computing Systems, pp. 1491-1503. 2016.
Zhou, J. et al. "AuraSense: enabling expressive around-smartwatch interactions with electric field sensing." In Proceedings of the 29th Annual Symposium on User Interface Software and Technology, pp. 81-86. 2016.

* cited by examiner

SYSTEM AND METHOD FOR ROBUST TOUCH DETECTION FOR ON-SKIN AUGMENTED REALITY/VIRTUAL REALITY INTERFACES

CROSS-REFERENCE TO RELATED APPLICATIONS

This application claims the benefit under 35 U.S.C. § 119 of Provisional Application Ser. No. 62/973,569, filed on Oct. 11, 2019, which is incorporated herein by reference.

STATEMENT REGARDING FEDERALLY SPONSORED RESEARCH

Not applicable.

BACKGROUND OF THE INVENTION

Augmented reality and virtual reality (AR/VR) systems generally rely on either handheld controllers or in-air bare hand gestures for user input. Both of these approaches excel at fluid, coarse-grained input but are weaker at fine-grained interactions, such as typing on a virtual keyboard. Indeed, it is rare to see closely packed targets in current AR/VR interfaces, and when they do appear, extra care must be taken by the user.

Other modalities are possible, which can improve the precision, bandwidth, and comfort of AR/VR interactions. One option is to directly modify the body, for example, by adding a sensing layer to the skin's surface or implanting sensors under the skin, though this approach is invasive and not all users are comfortable with such instrumentation. Optical approaches are also popular, the simplest of which use arrays of infrared proximity sensors integrated into worn devices. Drawbacks of these types of optical systems include the need to use markers or being limited to only finger-to-finger touches. Electrical systems have also been used. In one system, a ring emitter is used to inject radio frequency into a wearer's arm when touch contact is made. A smartwatch on the opposing arm containing multiple receiver electrodes is used to detect and track finger touches by comparing the relative phase of received signals. This arrangement requires both hands to be instrumented and does not consider integration into AR/VR headsets.

Other systems enable continuous on-skin touch tracking without markers. One such system includes using body-worn cameras and computer vision, which are generally very accurate at tracking fingers spatially. By operating on physical surfaces (i.e. the skin), users are often more accurate and report higher comfort than equivalent free-space interactions. Further, the ability for users to position arm-borne interfaces as they wish, in concert with increased input precision, affords greater privacy and may be less socially disruptive.

However, a common weakness across camera-based systems is the inability to accurately segment true touches from fingers hovering just above the skin as cameras often lack sufficient resolution or the field of view necessary to detect touches as opposed to hovering. This hover ambiguity makes end user touch interactions more cumbersome, with users often having to perform exaggerated (z-axis) trajectories to compensate. In one prior art system, only fingers above 2 cm from the surface were reliably determined as hovering. In contrast, on devices like smartphones, users rarely lift their fingers this high when e.g., typing or scrolling.

It would therefore be advantageous to develop an interface that allows fine-grained interaction with high precision and the ability to detect touch, while being comfortable and intuitive for the user.

BRIEF SUMMARY

According to embodiments of the present invention is a system and method that enables precise, high-frames per second (FPS) touch segmentation by using the body as a radio frequency (RF) waveguide for AR/VR applications. Other aspects of the invention include the spatial tracking strengths of computer vision, thereby enabling a combined system with both high accuracy tracking and robust touch segmentation. The system can be implemented with simple instrumentation, enabling many AR/VR applications without the need for expensive hardware for user input. For example, in one embodiment, the system comprises a single wristband (e.g. a smartwatch) and sensors integrated into a head-worn receiver (e.g. AR/VR headset). Further, the system and method of the present invention enables fine-grained interactions due to its precision, a feature commonly lacking in systems employing in-air hand gestures. The system, according to one embodiment, enables touchscreen-like interactions on the skin in AR/VR.

DETAILED DESCRIPTION

Figure 1:
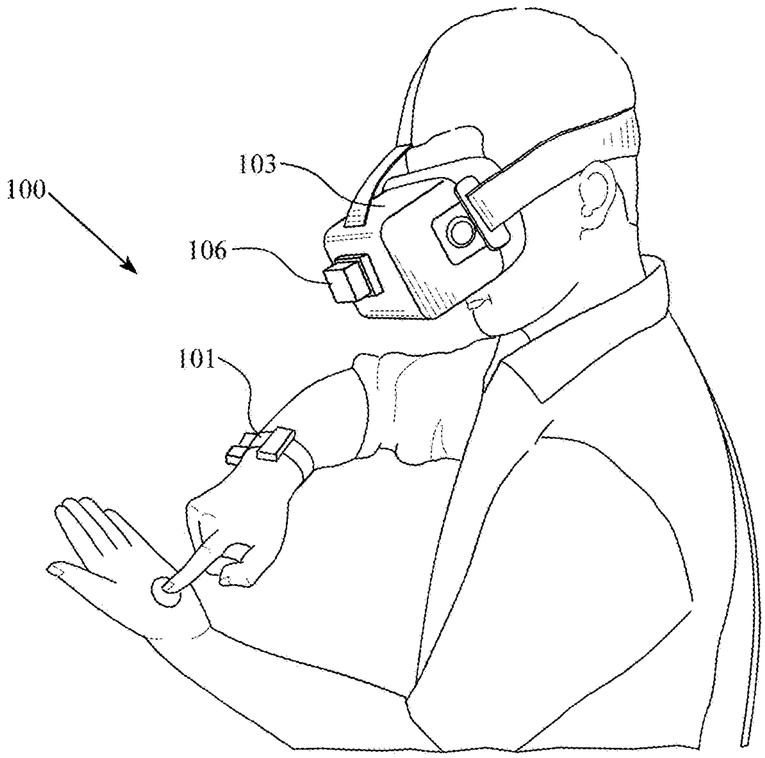
FIG. 1 depicts the system of the present invention, according to one embodiment.

The system and method of the present invention leverage the conductivity of the human body, which serves as a transmission medium for radio frequency (RF) signals. In one embodiment, the augmented reality/virtual reality (AR/VR) interface 100 comprises an emitter 101 and a receiver 102. As shown in FIG. 1, the emitter 101 can be a smartwatch or similar body-worn device and comprises two electrodes 110 used to transmit the signal into the user's body. The receiver 102 is housed within a AR/VR headset 103 and is capable of detecting the signal from the emitter 101.

Figures 2A, 2B, 2C:
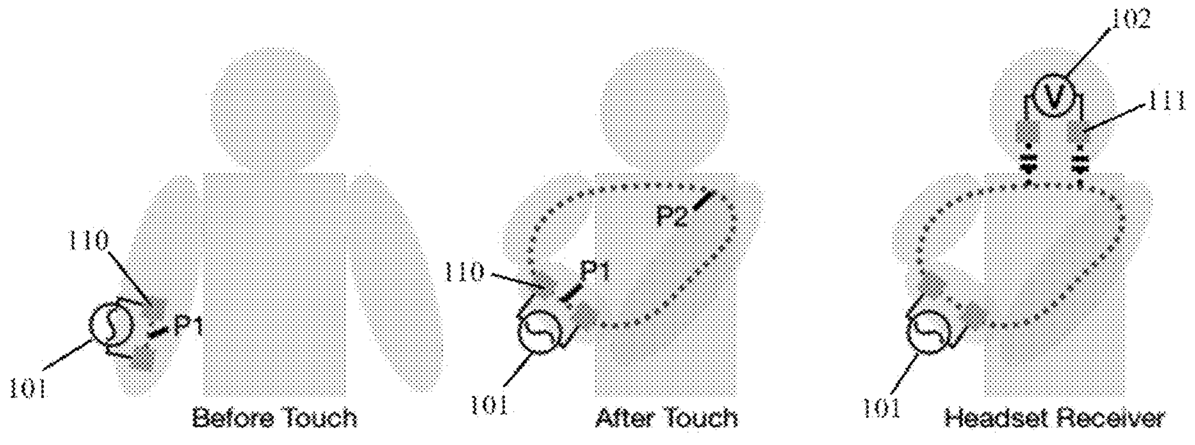
FIGS. 2A-2C depict the location of electrical paths generated by the system, according to one embodiment.

When a user wears an emitter 101 on the arm, wrist, hand, or other body part, the RF signal is conducted through the user's skin on a short path (P1) between the electrodes 110 of the emitter 101, as shown in FIG. 2A. When a user touches their arm or hand, a second, longer path (P2) is formed through the opposite arm from which the emitter 101 is worn. Path P2 is depicted on FIG. 2B. Thus, the RF signal emitted from a first electrode 110 on the emitter 101 travels through the user's body on both short path P1 and longer path P2 back to the ground electrode 110 of the emitter 101. Not only does the signal travel along path P2 during a touch event, but this circuit increases airborne RF radiation, where the user's body acts as a waveguide. The receiver 102 contains electrodes or antennas 111 that are placed in a location that is both along path P2 and proximate to the airborne radiation. In the embodiment shown in FIG. 2C, the receiver 102 is located on the AR/VR headset 103 as it offers an existing platform for instrumentation. In this embodiment, the electrodes 111 in the receiver 103 capacitively couple to path P2 to measure the signal. By detecting the RF signals at the receiver 102, the interface 100 utilizes the detection of a signal on path P2 as a touch detection mechanism. Absent a touch by the user, path P2 is eliminated and the interface 100 recognizes that no touch has been made.

In one alternative embodiment, the receiver 102 may be co-located with the emitter 101. However, in this configuration, the proximity of the receiver 102 to path P1 results in a poor signal-to-noise ratio (SNR). In another alternative embodiment, the receiver 102 can be worn on the opposite arm, wrist, or other body part, where it is not adjacent to path P1.

Figure 3A:
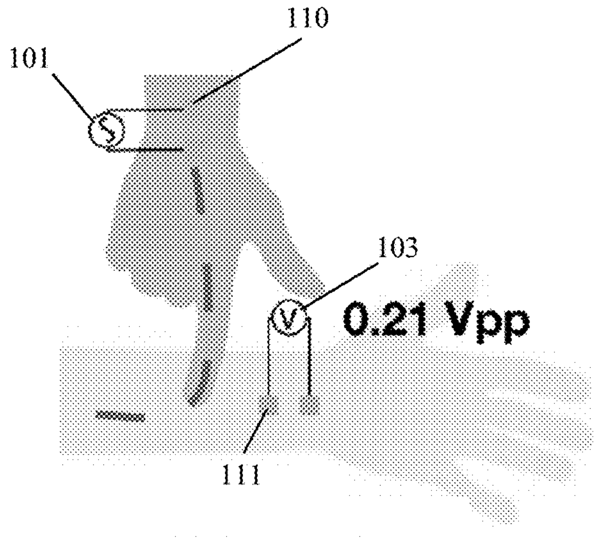
FIGS. 3A-3B show the location of a receiver relative to an electrical path.
Figure 3B:
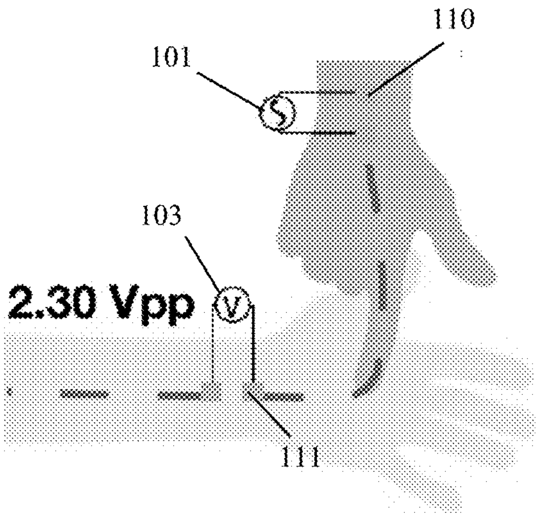

In one example embodiment, as shown in FIGS. 3A-3B, the emitter 101 (e.g., a battery-powered AD5930 waveform generator) is used to generate an RF signal and the receiver 102 (e.g., a battery-powered Bluetooth-enabled analog-to-digital converter) is used to measure signals received from the emitter 101. In this embodiment, the emitter 101 and receiver 102 use two 2×2 cm copper electrodes 110/111 attached longitudinally to the user's arm. The emitter 101 is worn on the wrist of the touching hand, and the receiver 102 sits on the opposite wrist (FIG. 3A). The emitter 101 is configured to output a 9 Vpp signal at 10.5 MHz. A signal with a frequency of 10.5 MHz propagates efficiently through the human body and is therefore used in this example. However, other frequencies in the RF range may be used. In addition, any low-voltage signal (i.e., below 12v or a voltage suitable for human transmission) can be used. As shown in FIGS. 3A-3B, placing the receiver inside P2 yields a stronger received signal (i.e 2.30 Vpp vs. 0.21 Vpp).

When a user touches their right index finger to their opposing palm, an inside circuit is formed (FIG. 3B), where the receiver 102 is located within path P2. When a user touches their forearm, an outside circuit is formed (FIG. 3A), where the receiver 102 remains outside of the path P2. When the receiver 102 is outside of path P2, the on-touch signal delta (i.e., the difference between touch and hover) was 0.21 Vpp on average. When the receiver 102 was placed inside P2, the measured on-touch signal delta increased to 2.30 Vpp.

In the example embodiment discussed above, copper electrodes 110/111 were used as they permit efficient and reliable injection of AC signals into the human body. A person having skill in the art will appreciate that other materials can be used for the electrodes 110/111, including copper coated by a thin layer of Kapton tape, silver fabric, dry medical electrode, wet medical electrode, and others known in the art. Good skin-electrode contact is key to achieving strong and reliable RF signal; if users prefer looser fitting of the emitter 101 or headset 103, there can be a reduction in performance.

Figure 4:
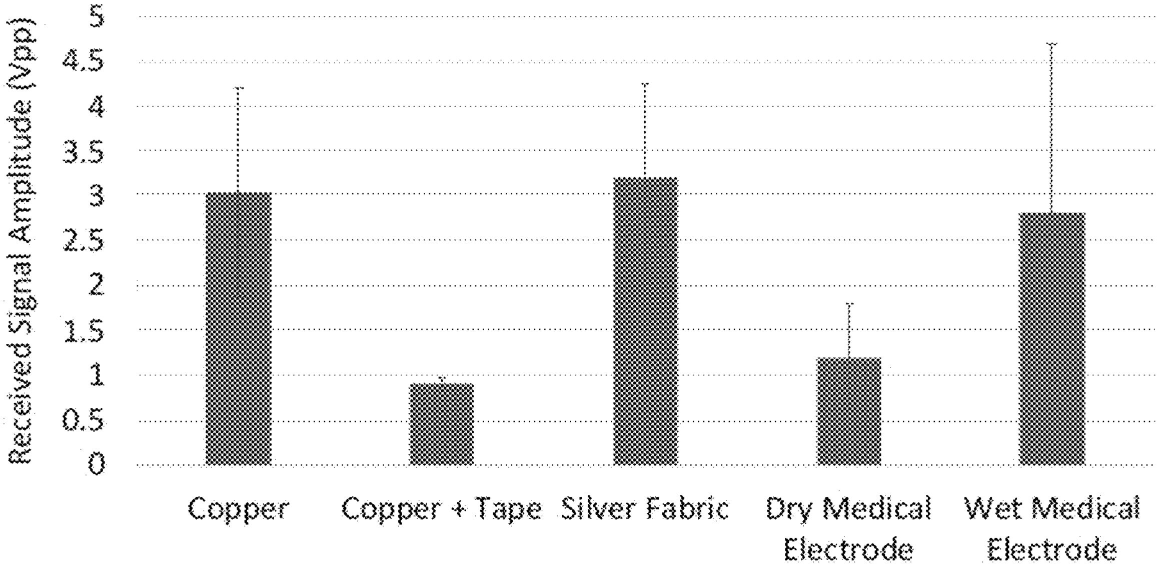
FIG. 4 is a graph showing the performance of different types of electrodes.

FIG. 4 shows the relative performance of each type of electrode 110/111 when used in connection with a 9 Vpp swept-frequency signal (100 kHz to 12 MHz) injected with one electrode 110, while measuring the received signal amplitude from the other electrode 110. As shown in FIG. 4, the silver-based fabric provides the strongest received signal. However, copper with Kapton tape yielded the most consistent response across all signal frequencies and may be useful depending on the particular application in which the interface 100 is used.

Figure 5:
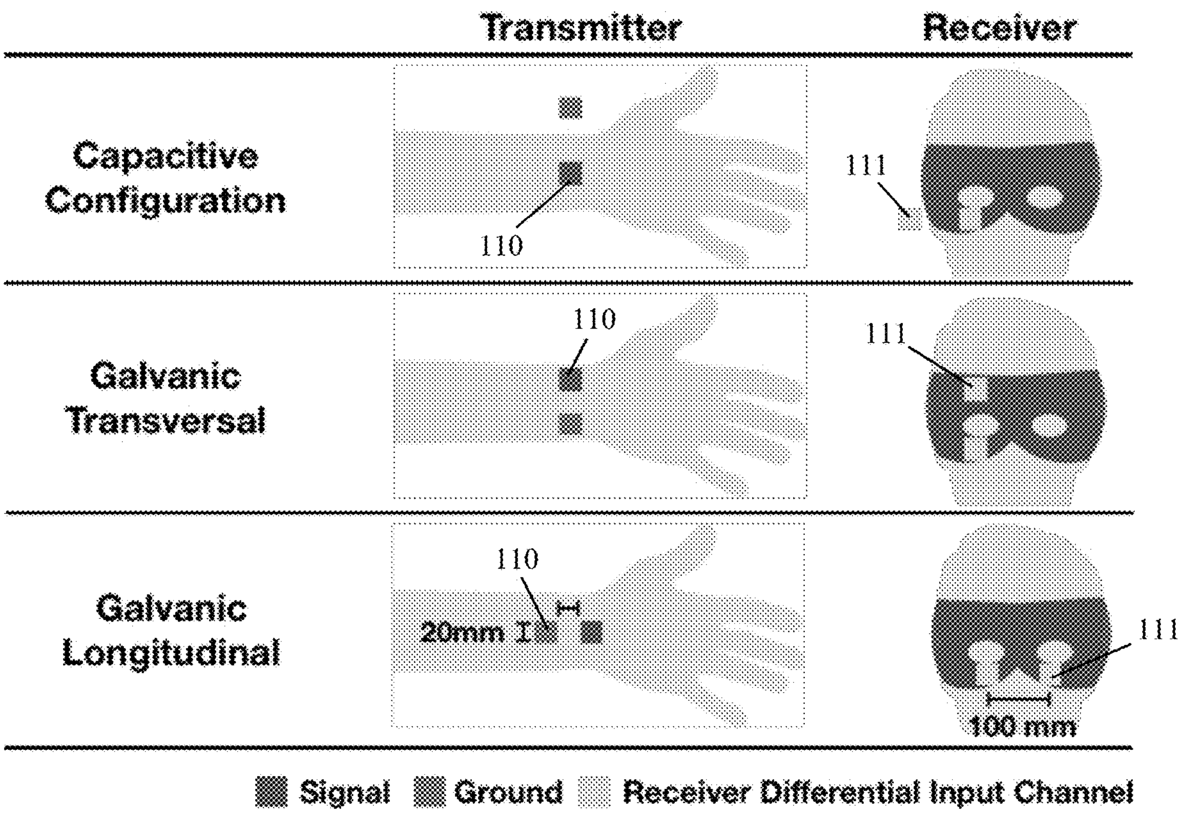
FIG. 5 shows various emitter/receiver configurations.

Electrode 110/111 placement on the body can affect the quality of the signal received. Two electrode configurations can be used—capacitive and galvanic. In a capacitive configuration (FIG. 5), the signal electrode 110 of the emitter 101 is attached to a user's skin while the ground electrode 110 of the emitter 101 is floating, capacitively coupling to earth common ground. In a galvanic configuration, both signal and ground electrodes 110 are attached to a user's body. Two arrangements are possible in the galvanic configuration—transversal and longitudinal (see FIG. 5).

Figure 6:
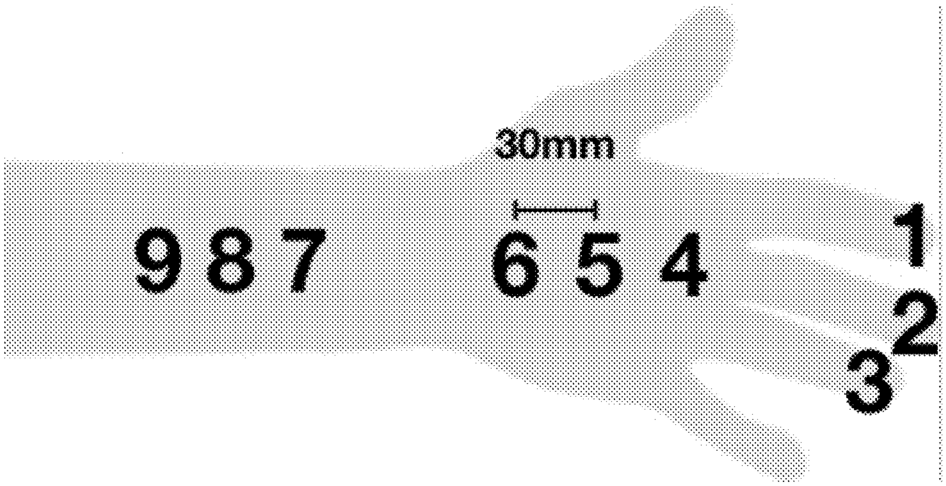
FIG. 6 is a diagram showing locations on a user's arm and hand where a touch can occur.

Table 1 shows results from different pairings of emitter 101 and receiver 102 configurations. For all nine emitter-receiver combinations, the emitter 101 sweeps from 100 kHz to 12 MHz at 9 Vpp. The received signal strength is measured at nine touch locations (FIG. 6) on the user's fingers, hand, and forearm. The signal is measured while the participant is hovering –1 cm above the skin and touching the skin, recording the amplitude before and after touch. Results are shown in Table 1 (combining all touch locations and frequencies for each emitter-receiver configuration). As shown in Table 1, the configuration that used the galvanic longitudinal electrode placement for both the emitter 101 and receiver 102 yielded the best on-touch signal. The swept frequency data also shows that 10.5 MHz offers the best SNR.

TABLE 1

Average on-touch signal delta (unit mVpp)

| | Transmitter | | |
|---|---|---|---|
| Receiver | Galvanic Longitudinal | Galvanic Transversal | Capacitive Configuration |
| Galvanic Long. | 3.69 | 1.93 | 2.92 |
| Galvanic Transversal | 0.72 | 0.23 | 0.95 |
| Capacitive Config. | 0.81 | 1.04 | 2.40 |

Using the interface 100 of the present invention, user's may be concerned about the current inserted into their body. The injected current can be estimated by measuring the bio-impedance at the user's wrist. For the embodiment discussed above, an average RMS bio-impedance of 420 Ohm has been demonstrated. Thus, the maximum contact current should be ~10 mA when the output voltage is configured at 9 Vpp. There is no research linking this frequency range and current to negative health effects.

Figure 7:
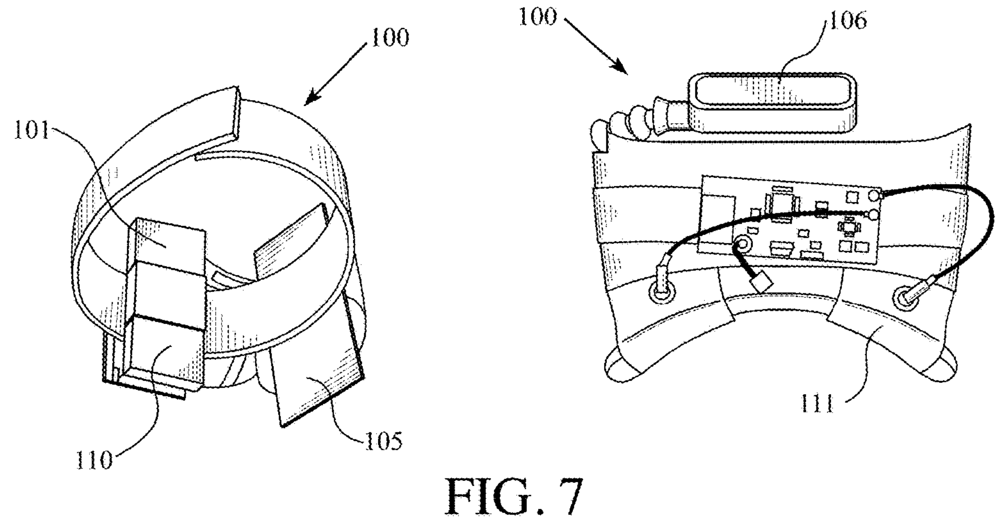
FIG. 7 is the system of the present invention, according to one embodiment, where the receiver is integrated into an AR/VR headset.

FIG. 7 depicts an interface 100 integrated with an AR/VR headset 103, with the interface 100 comprising electrodes 110/111 connected to PCBs used for the emitter 101 and receiver 102, a controller 105, software, and wrist-and head-worn hardware. In this particular example embodiment, the emitter 101 is built around an AD5930 signal generator chip. To interface with this chip, the interface 100 uses a Freescale K20P64M72SF1 microcontroller 105 running at 96 MHz with Teensy firmware. The AD5930 board is configured to output a 10.5 MHz signal at 200 mVpp. The DC component of the emitter 101 is removed and amplifies this signal to 9 Vpp. The board is powered by a 3.7 V lithium ion polymer battery. The emitter 101 includes two 2×2 cm silver-fabric electrodes 110 with a 2 cm spacing. As shown in FIG. 7, all of these components are affixed to an elastic Velcro strap worn on the wrist.

The receiver 102 features a two-stage differential signal amplification analog frontend with a gain of 10, built around a LT1806 opamp. The amplified signal is DC biased to 1.5 V with a voltage reference chip and sampled at 2 MHz by the microcontroller's built-in ADC. Raw measurements are sent to a laptop or other computing device over Bluetooth at 50 FPS for additional processing. In alternative embodiments, signal processing may occur on the controller 105 or other components worn by the user. The receiver 102 is powered by a 3.7 V lithium ion polymer battery. The electrodes 111 are placed on the soft region below the eyes, which offers the most reliable skin-to-electrode contact.

In the embodiment shown in FIG. 7, a tracking software component of the interface 100 runs on a 4-core Intel i7 laptop. After the software receives measurements from the receiver 102 over Bluetooth, it computes an FFT (non-overlapping window of size 128). The interface 100 uses the FFT bin that contains 10.5 MHz as the RF signal strength indicator for touch segmentation. Due to changes in user posture and varying proximity of the hands to the head, it is not possible to use the raw amplitude of the received signal for touch detection. Instead, the interface 100 uses the first derivative—a sudden and significant increase in signal amplitude indicates a Finger Touch Down event, whereas a sudden decrease indicates a Finger Touch Up event. This signal is sufficiently clean and characteristic that it can use fixed thresholds with basic hysteresis.

Figure 8:
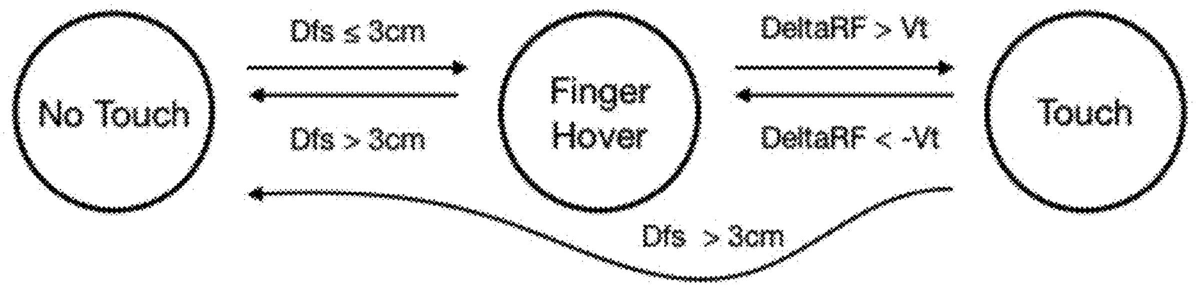
FIG. 8 is a flowchart of the process for detecting a touch.

In an alternative embodiment, the interface 100 uses a tracking system 106 to track a user's fingers and arms in 3D. In one example, the interface 100 includes a Leap Motion camera-based system (Orion SDK) attached to the front of the headset 103 as the tracking system 106. In addition to camera-based hardware, the tracking system 106 may include other optical systems, LIDAR, magnetic systems, and an inertial measurement unit worn by the user. By integrating the tracking system 106, the interface 100 tracks the index finger and its distance to the opposing palm and arm planes. If the finger gets closer than 3 cm to one of these interactive planes, the detection pipeline changes from No Touch to a Finger Hover state. While in this state, if the first derivative of the received signal is above a threshold, the system moves to a Finger Touch state. If the first derivative exceeds a second, negative threshold, the system moves back to a Finger Hover state. If the finger moves further than 3 cm away from either the palm or arm, the state returns to No Touch. FIG. 8 offers an overview of this algorithm. In addition, although multi-finger touches result in stronger received signal than single-finger touches, it can be difficult to reliably distinguish these two events. Computer vision could be used to predict the number of touching fingers based on hand pose.

The touch segmentation latency of the interface 100—from the moment the finger touches the skin to the instant the software detects the touch event—is 141 ms on average. In an alternative embodiment, the latency can be improved by forgoing Bluetooth transmission and laptop processing, and instead performing all compute on processors found in the AR/VR headset 103 or controller 105.

Figure 9:
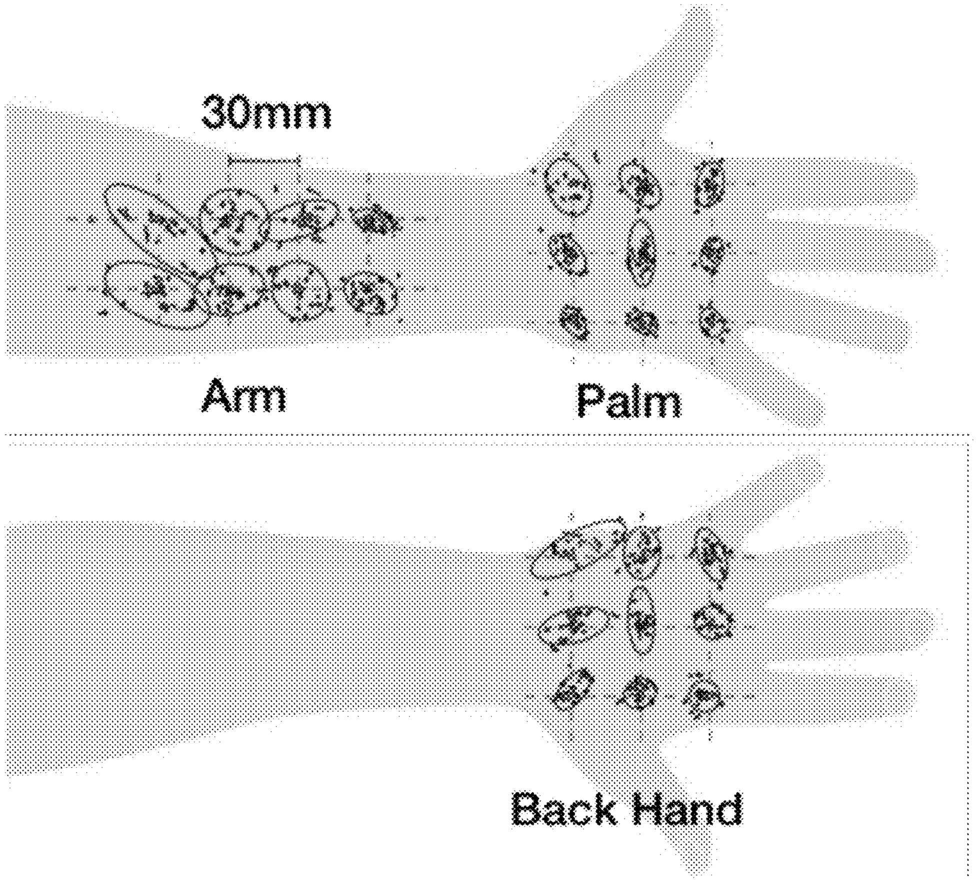
FIG. 9 shows the location of touches relative to a target.
Figure 10:
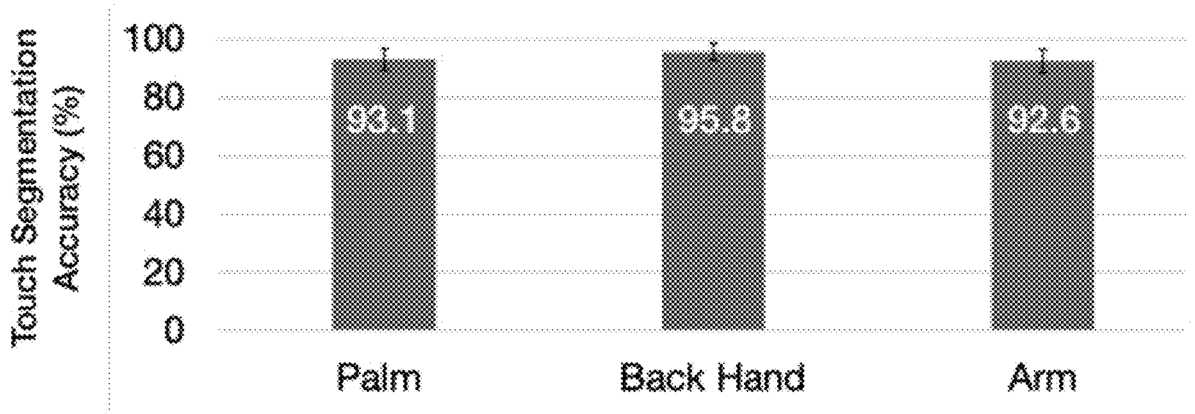
FIG. 10 is a chart showing the accuracy of the system for touches on different parts of the user's body.

FIG. 9 shows depicts the performance of the interface 100, with touches shown as dots near cross-hairs drawn at 30 mm-intervals on three body locations (i.e. the palm, back of hand, and forearm). In logging touches, false positives were also recorded, where the finger was very close, but not touching the skin, and recorded as a touch. On average, the interface 100 achieved a touch segmentation accuracy of 93.8% (SD=2.0). FIG. 10 shows the accuracy broken out by body location. Of the errors, 24.2% were false negatives (i.e., Touch recognized as Hover) and 75.8% were false positives (i.e., Hover recognized as Touch).

In an alternative embodiment that includes a camera-based tracking system 106, the touch tracking spatial precision of the interface 100 can be evaluated. The interface 100 achieves a mean distance error of 5.3 mm (SD=1.1). FIG. 9, which plots all touch trials, also shows the 97.8% (mean+2σ) confidence ellipses.

Figure 11:
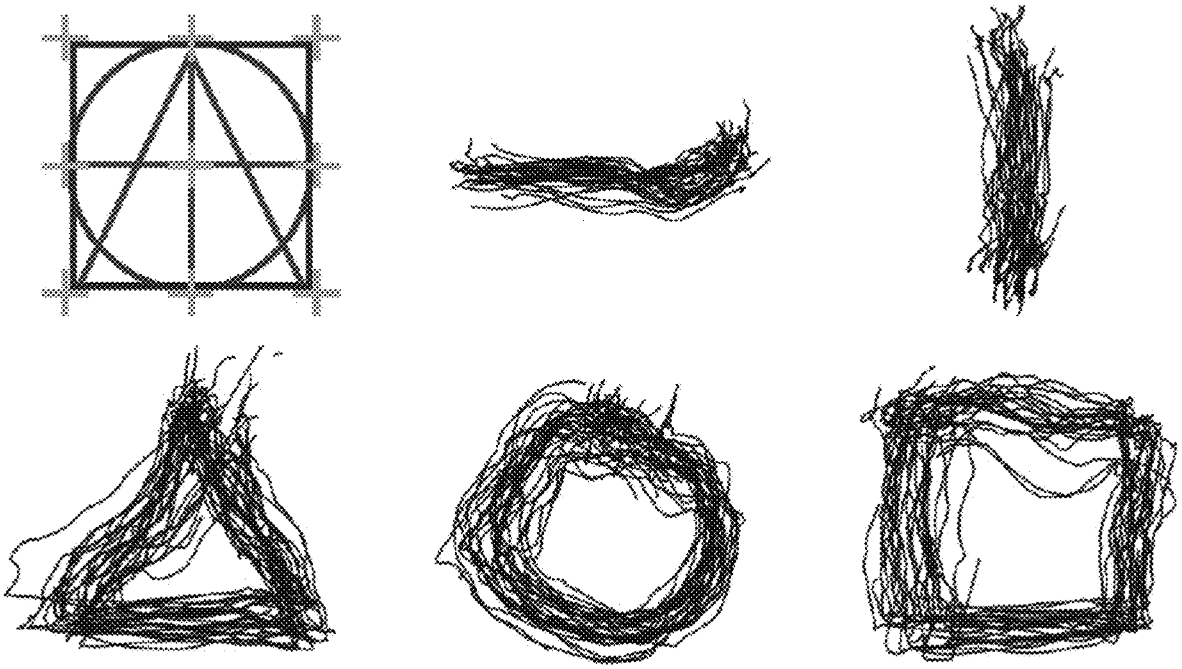
FIG. 11 shows different shapes drawn by a user of the interface system.

To test the continuous touch tracking capability of the interface 100, a group of users drew five different shapes on their palms (FIG. 11), repeated three times each, as naturally as they would on a conventional touchscreen. FIG. 11 shows the raw drawn paths superimposed from all participants, with no post-hoc corrections or per user calibration. As shown in FIG. 11, the interface 100 allows touchscreen-like interaction.

In an alternative embodiment where the receiver 102 is a wrist-worn receiver 102 (worn on the opposite arm to the wrist-worn emitter 101), instead of the receiver 102 integrated into a headset, the interface 100 achieves a mean touch segmentation accuracy of 95.8% (SD=2.3), with a mean tracking distance error of 4.3 mm (SD=0.7). This is slightly more accurate than the headset receiver 102 embodiment, though this arrangement requires instrumentation of both wrists.

Figure 12A:
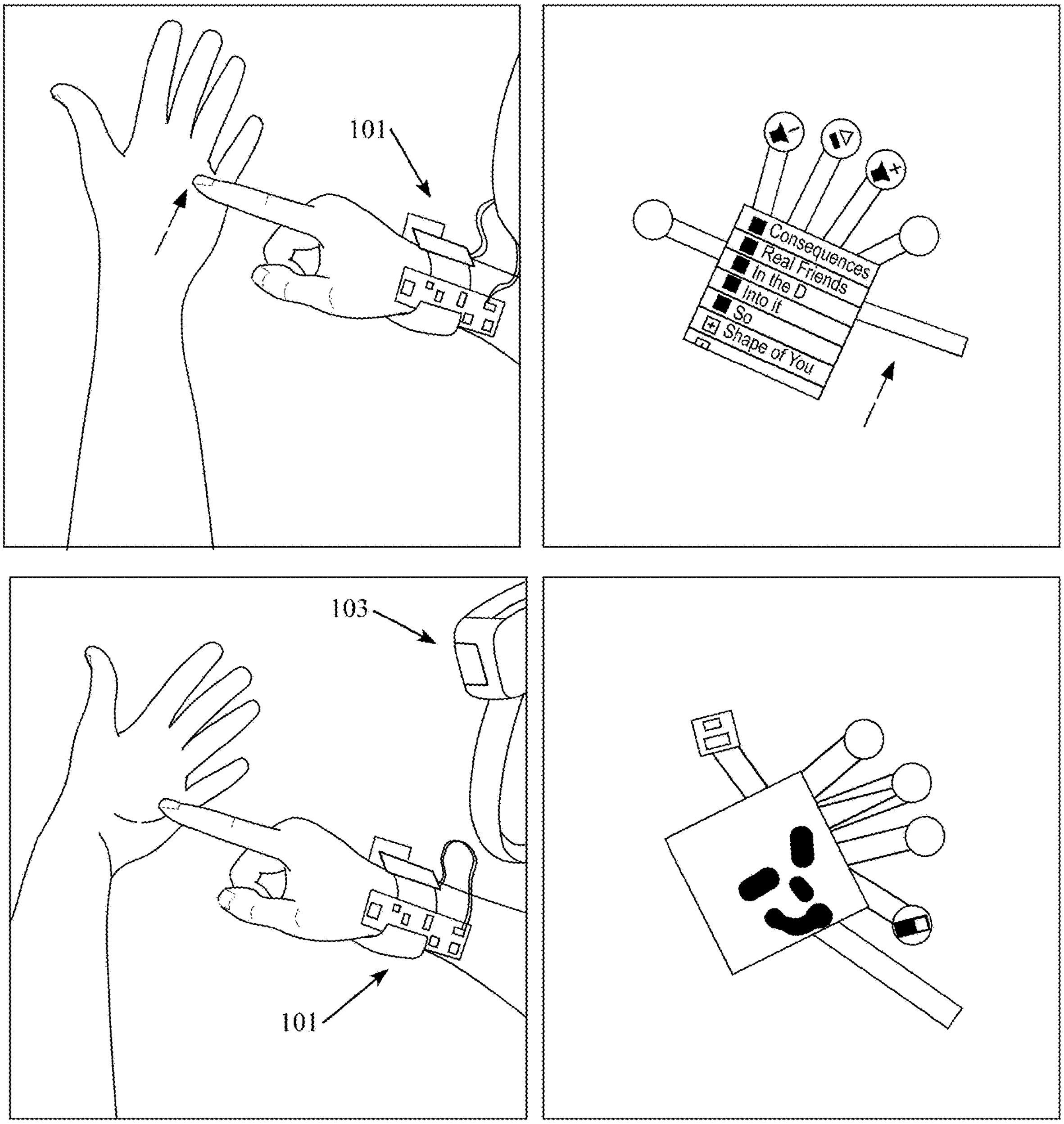
FIGS. 12A-12B depict applications of the system.
Figure 12B:
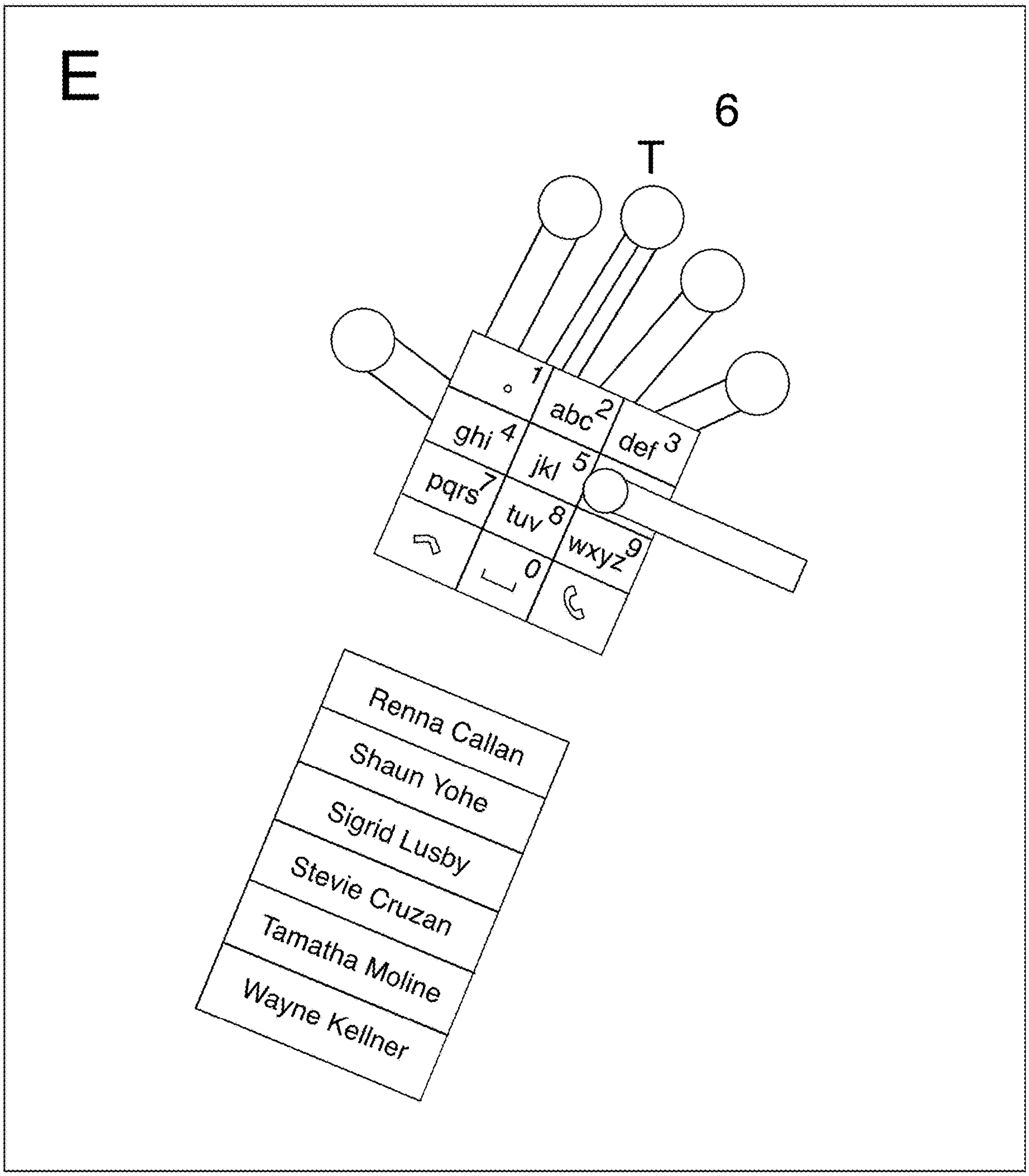

FIGS. 12A-12B depict example applications, including a dial pad, a music player, and a drawing app. The dial pad app, seen in FIG. 12B, is automatically placed on the palm and features the standard 3×4 grid of buttons. On the longer forearm region, the interface 100 places a scrollable list of contacts. A scroll bar for fast alphabetical navigation is located on the middle finger. FIG. 12A shows a screenshot of a music player application, which uses contemporary scrolling and swiping gestures to navigate between songs, as well as buttons for pause/play and volume control. Finally, a drawing app (FIG. 12A) highlights fine grained continuous tracking (beyond directional swipes). In addition to the main canvas area on the palm, the fingers are used as buttons (save, pause/play, erase/paint toggle) and sliders (controls for brush thickness, brush color).

As the headset receiver 102 is sensitive to airborne radiation from the emitter 101, some poses (especially those that bring the arms closer to the head) cause interference. For this reason, the first derivative of the received signal is used, as poses tend to change less rapidly than the instantaneous touching of a finger to the skin. Nonetheless, this method may still lead to false positives. Likewise, the amplitude of the first derivative was impacted by user pose and distance between emitter 101 and receiver 102, and thus a dynamic threshold could be employed in some embodiments. Finally, touching large conductive surfaces (e.g., laptops, magnetic whiteboards, appliances with metal enclosures) amplifies the received signal. This effect can be used to support on-world touch interactions.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

Further, the features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. In particular, one or more features in any of the embodiments described herein may be combined with one or more features from any other embodiments described herein.

Protection may also be sought for any features disclosed in any one or more published documents referred to and/or incorporated by reference in combination with the present disclosure.

What is claimed is:

1. A system for detecting touches to skin of a user by the user, wherein the user is wearing an augmented reality/virtual reality headset, the system comprising:
- an emitter that generates an electrical signal, the emitter comprising a first electrode and a second electrode, with at least one of the first electrode and the second electrode adapted to be in contact with the skin on a first arm of the user,
  - wherein a first electrical path is established between the first electrode through the user's skin on the first arm to the second electrode,
  - wherein a second electrical path is established between the first electrode through a second arm of the user to the second electrode when the user contacts the first arm and the second arm;
- a receiver that detects the electrical signal along at least one of the first electrical path and the second electrical path; and
- a controller in communication with the receiver,
  - wherein the controller receives the signal and identifies an increase in the electrical signal received by the receiver to indicate contact between the first arm and the second arm.

2. The system of claim 1, wherein the receiver is located on the headset.

3. The system of claim 1, wherein the receiver is located on the second arm.

4. The system of claim 1, wherein the receiver is located on the first arm.

5. The system of claim 1, wherein the electrical signal comprises a low-voltage AC signal oscillating at megahertz frequencies.

6. The system of claim 1, wherein the second electrical path generates an airborne signal emanating from the user's body.

7. The system of claim 6, wherein the receiver detects the airborne signal.

8. The system of claim 1, further comprising:
- a tracking system for tracking the user.

9. The system of claim 8, wherein the controller indicates contact only when the tracking system indicates the first arm is in proximity to the second arm.

10. The system of claim 1, wherein the controller identifies an increase in the electrical signal by comparing a first derivative of the electrical signal to a threshold.

11. The system of claim 10, wherein the controller identifies a no-touch condition by comparing a first derivative of the electrical signal to a second, negative threshold.

12. The system of claim 8, wherein the tracking system is selected from the group consisting of an optical system, a camera-based system, LIDAR, a magnetic system, and an inertial measurement unit.

13. The system of claim 1, wherein the increase in the electrical signal comprises a voltage increase.

14. A method of identifying contact between a first arm and a second arm of a user, the method comprising:
- emitting a radio frequency signal from an emitter in contact with the first arm of the user,
  - wherein a primary electrical path is established on the first arm;
- receiving the signal at a receiver in contact with a body part of the user; and
- identifying an increase in the signal resulting from the signal following a secondary electrical path comprising the first arm and the second arm, the secondary electrical path formed when the first arm contacts the second arm.

15. The method of claim 14, further comprising:
- using a tracking system to track a position of the first arm relative to the second arm;
- and monitoring the secondary electrical path when the tracking system indicates that the first arm is proximate the second arm.

16. The method of claim 14, wherein identifying an increase in signal comprises:
- comparing a first derivative of the signal to a threshold.

17. The method of claim 14, wherein the body part is the user's head.

18. The method of claim 17, wherein the receiver is integrated into an augmented reality/virtual reality headset.

19. The method of claim 14, wherein the body part is the second arm.

20. The method of claim 17, wherein the increase in the signal comprises a voltage increase.

* * * * *